(12) United States Patent
Taniguchi

(10) Patent No.: US 11,730,577 B2
(45) Date of Patent: Aug. 22, 2023

(54) ORAL CAVITY WASHING DEVICE

(71) Applicant: Panasonic Intellectual Property Management Co., Ltd., Osaka (JP)

(72) Inventor: Shinichi Taniguchi, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 56 days.

(21) Appl. No.: 16/745,068

(22) Filed: Jan. 16, 2020

(65) Prior Publication Data

US 2020/0229906 A1    Jul. 23, 2020

(30) Foreign Application Priority Data

Jan. 21, 2019   (JP) .................................. 2019-007991

(51) Int. Cl.
*A61C 17/02*    (2006.01)
*A61H 13/00*   (2006.01)

(52) U.S. Cl.
CPC ...... *A61C 17/0211* (2013.01); *A61C 17/0202* (2013.01); *A61H 13/00* (2013.01)

(58) Field of Classification Search
CPC ... A61C 17/02; A61C 17/0202; A61C 17/024; A61C 17/08; A61C 17/125;

(Continued)

(56) References Cited

U.S. PATENT DOCUMENTS 3,476,105 A * 11/1969 Abramowitz ........ A46B 11/063
                                                                    601/162
3,487,828 A *  1/1970 Troy .................. A61C 17/0202
                                                                    601/162

(Continued)

FOREIGN PATENT DOCUMENTS

JP        S62-213752 A      9/1987
JP        S62-299260 A     12/1987

(Continued)

OTHER PUBLICATIONS

G. Fowles, W.H. Boyes, Chapter 6—Measurement of Flow, Editor(s): Walt Boyes, Instrumentation Reference Book (Fourth Edition), Section 6.3.1.2 (Year: 2009).*

(Continued)

*Primary Examiner* — Jacqueline T Johanas
*Assistant Examiner* — Shannel Nicole Belk
(74) *Attorney, Agent, or Firm* — McDermott Will & Emery LLP

(57) ABSTRACT

An oral cavity washing device includes a nozzle and a pump that supplies a liquid to the nozzle. The nozzle has a nozzle flow passage and a reduced part that is disposed in an intermediate part of the nozzle flow passage and that is smaller in cross-sectional area than a rest of the nozzle flow passage. A first flow passage and a second flow passage that are in parallel to each other are disposed between the nozzle and the pump. The first flow passage has a first valve that causes the first flow passage to be opened only when the pump sucks the liquid. The second flow passage has a second valve that causes the second flow passage to be opened only during discharge performed by the pump.

9 Claims, 13 Drawing Sheets

(58) Field of Classification Search
CPC ........ A61C 17/028; A61B 2017/32032; B05B 1/083; A61M 3/00; A61M 11/00; A61H 13/00; A61H 13/005
USPC .......................................... 601/162; 239/571
See application file for complete search history.

(56) References Cited

U.S. PATENT DOCUMENTS

| | | | | |
|---|---|---|---|---|
| 3,590,813 | A * | 7/1971 | Roszyk | A61C 1/0092 601/162 |
| 4,442,831 | A * | 4/1984 | Trenary | A61H 13/005 601/162 |
| 5,218,956 | A * | 6/1993 | Handler | A61C 17/032 601/155 |
| 5,697,784 | A * | 12/1997 | Hafele | A61C 17/02 433/85 |
| 5,800,367 | A * | 9/1998 | Saxer | A61C 17/028 601/164 |
| 5,820,373 | A * | 10/1998 | Okano | A61C 17/02 433/80 |
| 5,860,942 | A * | 1/1999 | Cox | A61C 17/0202 601/155 |
| 6,030,215 | A * | 2/2000 | Ellion | A46B 11/001 222/324 |
| 6,139,319 | A * | 10/2000 | Sauer | A61C 17/0202 601/165 |
| 6,155,824 | A * | 12/2000 | Kamen | A61C 17/0208 604/35 |
| 6,375,459 | B1 * | 4/2002 | Kamen | A61C 17/0208 604/35 |
| 8,113,832 | B2 * | 2/2012 | Snyder | A61C 17/0202 433/80 |
| 11,076,939 | B2 * | 8/2021 | Follows | A61C 17/221 |
| 2007/0184404 | A1 * | 8/2007 | Johnki | A61C 17/0211 433/80 |
| 2008/0008979 | A1 * | 1/2008 | Thomas | A61C 17/0205 433/80 |
| 2011/0207078 | A1 | 8/2011 | Johnson et al. | |
| 2012/0156641 | A1 * | 6/2012 | Wada | A61C 17/20 433/82 |
| 2014/0349246 | A1 * | 11/2014 | Johnson | A61C 17/22 433/80 |
| 2015/0148782 | A1 * | 5/2015 | Brown | A61C 19/063 604/514 |
| 2018/0116774 | A1 | 5/2018 | Coleman et al. | |
| 2018/0132990 | A1 * | 5/2018 | Baeten | A61C 5/40 |
| 2018/0221122 | A1 * | 8/2018 | Nunomura | A61C 1/0092 |
| 2019/0201175 | A1 * | 7/2019 | Li | A61C 17/032 |

FOREIGN PATENT DOCUMENTS

| | | | |
|---|---|---|---|
| JP | 9-084809 A | 3/1997 | |
| JP | 2018-126282 A | 8/2018 | |
| WO | WO-9948435 A1 * | 9/1999 | ......... A61C 17/0208 |
| WO | 2018/086377 A1 | 5/2018 | |

OTHER PUBLICATIONS

Extended European Search Report dated May 18, 2020 for the related European Patent Application No. 20151388.4.
English Translation of Chinese Search Report dated Mar. 15, 2022 for the related Chinese Patent Application No. 202010040514.5.

* cited by examiner

FIG. 2A
FIG. 2B
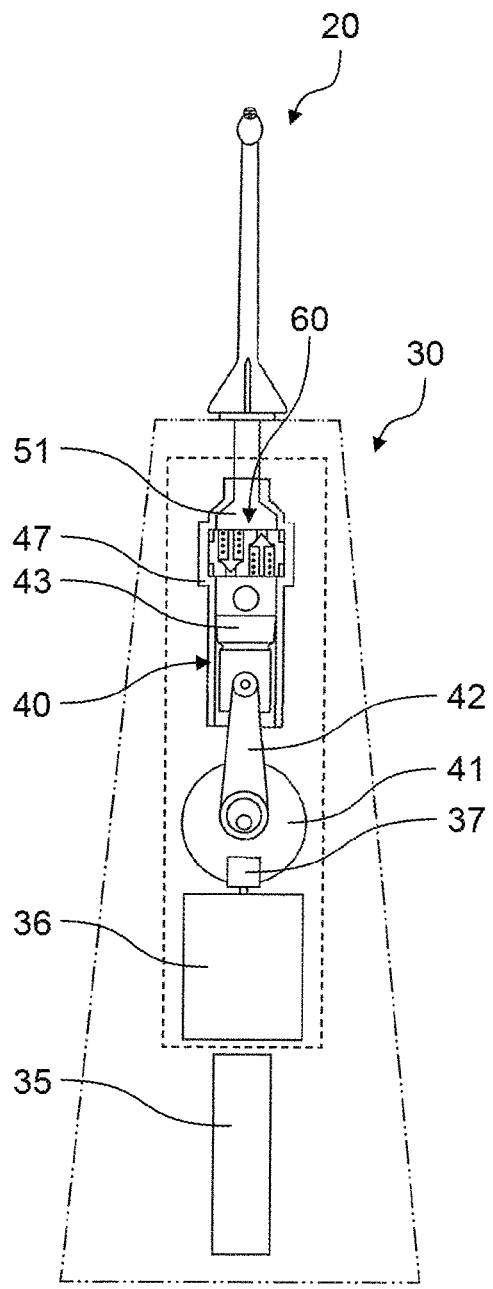
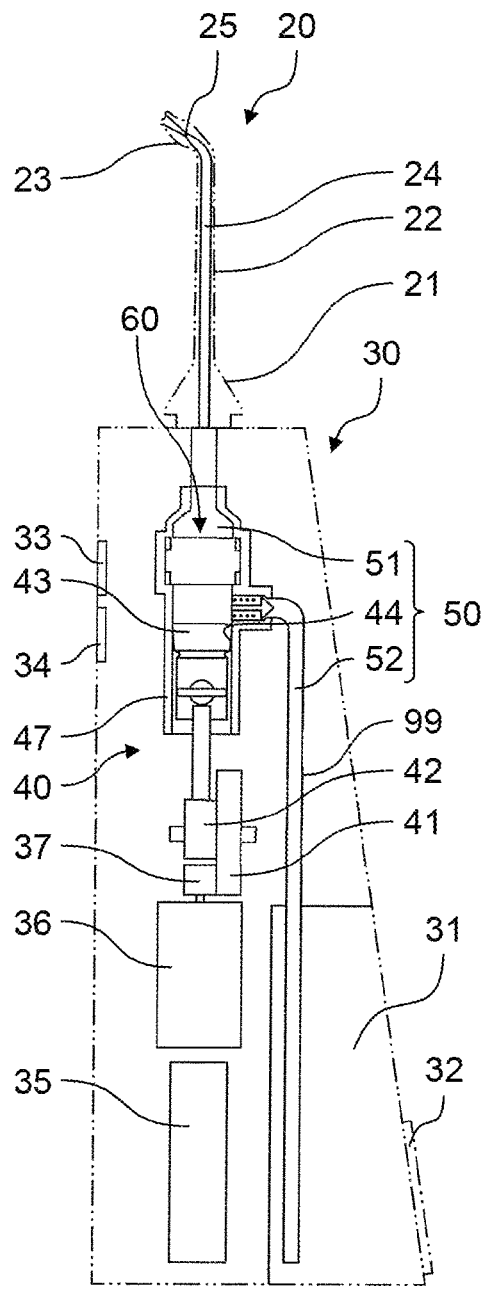

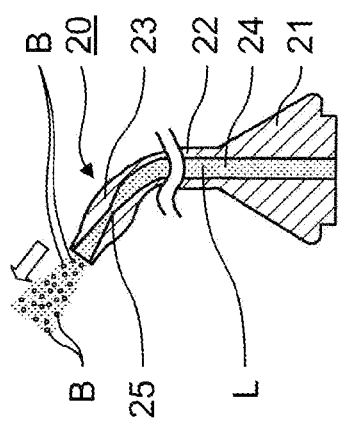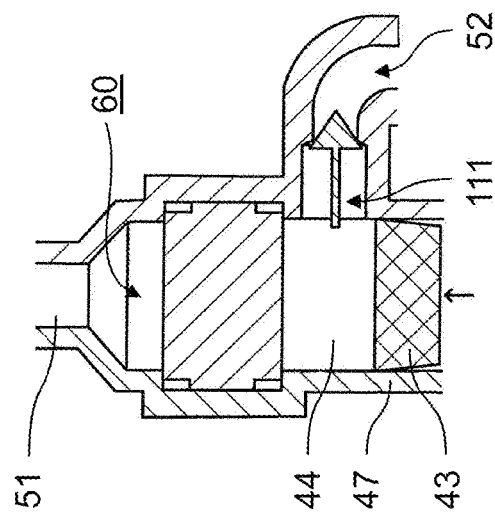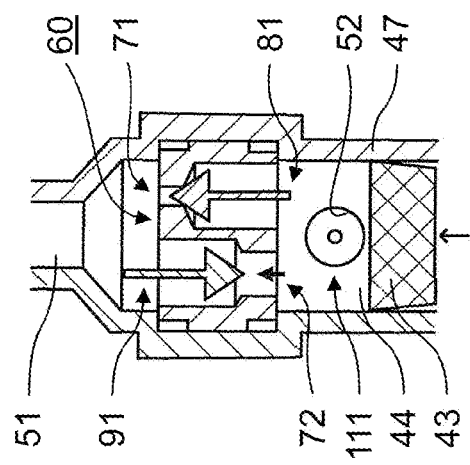

ORAL CAVITY WASHING DEVICE

BACKGROUND

1. Technical Field

The present disclosure relates to an oral cavity washing device.

2. Description of the Related Art

It is known that a nozzle of an oral cavity washing device disclosed in Unexamined Japanese Patent Publication No. 2018-126282 has a reduced part in a middle of the nozzle flow passage, the reduced part being smaller in cross-sectional area than the other part of the flow passage. Since the reduced part allows a liquid discharged from the nozzle to contain a large number of bubbles, the oral cavity washing device provides improved washing performance.

SUMMARY

It is desired that the oral cavity washing device provide an increase in a number of bubbles contained in the liquid to improve washing performance.

Accordingly, the present disclosure provides an oral cavity washing device that offers improved washing performance by discharging a liquid containing an increased number of bubbles.

An oral cavity washing device according to an aspect of the present disclosure includes a nozzle and a pump that supplies a liquid to the nozzle. The nozzle has a nozzle flow passage and a reduced part in a middle of the nozzle flow passage, the reduced part being smaller in cross-sectional area than a rest part of the nozzle flow passage. A first flow passage and a second flow passage are in parallel to each other and disposed between the nozzle and the pump. The first flow passage has a first valve that causes the first flow passage to be opened only when the pump sucks the liquid. The second flow passage has a second valve that causes the second flow passage to be opened only when the pump discharges the liquid.

The technique according to the present disclosure enables the oral cavity washing device to discharge a liquid containing an increased number of bubbles and provide improved washing performance.

BRIEF DESCRIPTION OF THE DRAWINGS

FIGS. 2A and 2B are explanatory views schematically showing an internal structure of the oral cavity washing device according to the first exemplary embodiment;

FIGS. 9A, 9B and 9C are explanatory views showing states of the components of the oral cavity washing device according to the first exemplary embodiment during discharge;

DETAILED DESCRIPTION

Oral cavity washing devices according to exemplary embodiments will now be described in detail with reference to the attached drawings. The exemplary embodiments described below are preferred specific examples of the present disclosure. Therefore, numeric values, shapes, materials, constituents, dispositions and connection modes of the constituents, and the like, which are shown in the following exemplary embodiments, are merely examples, and are not intended to limit the present disclosure. Accordingly, among the constituents in the following exemplary embodiments, constituents which are not recited in the independent claims for the most generic concept of the present disclosure are described as arbitrary constituents.

The drawings are schematic views, and are not always exactly illustrated. In the respective drawings, identical components are denoted by identical reference symbols.

First Exemplary Embodiment

Figure 1A:
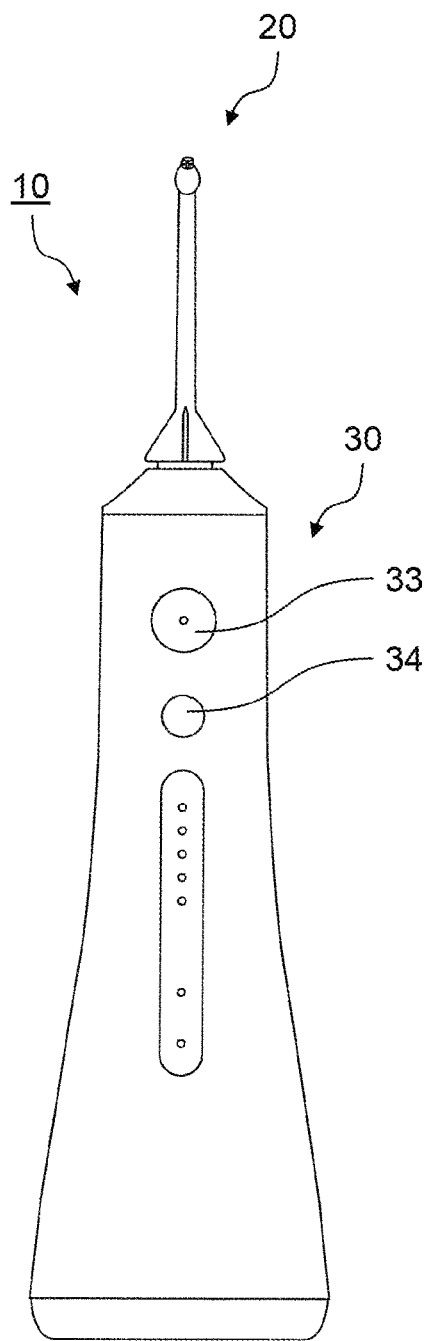
FIGS. 1A and 1B are schematic explanatory views showing a configuration of an oral cavity washing device according to a first exemplary embodiment.
Figure 1B:
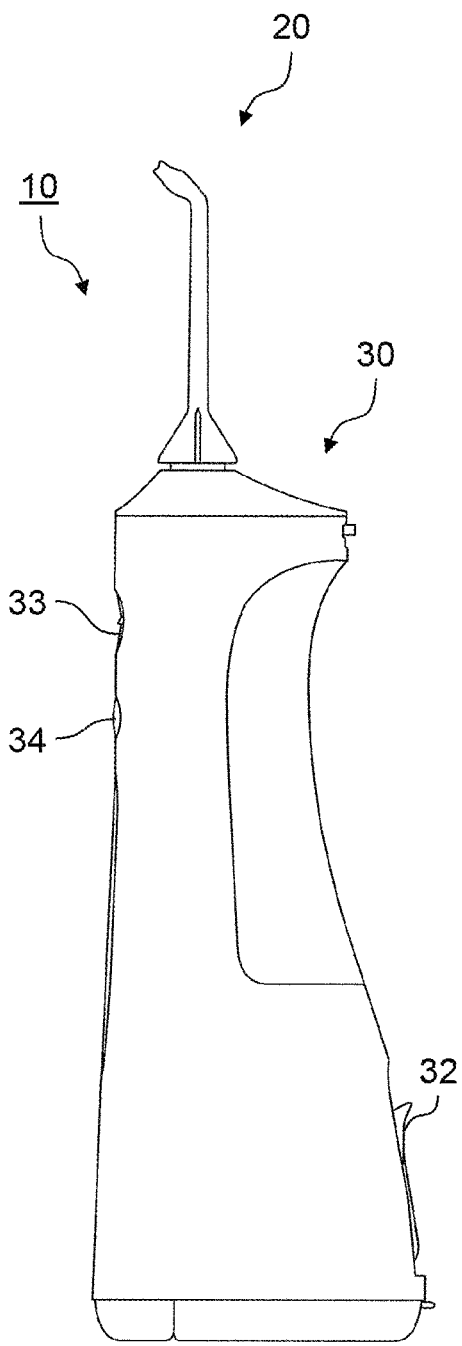

First, oral cavity washing device 10 according to a first exemplary embodiment will be described. FIGS. 1A and 1B are schematic explanatory views showing a configuration of oral cavity washing device 10 according to the first exemplary embodiment. FIG. 1A is a front view of oral cavity washing device 10, and FIG. 1B is a side view of oral cavity washing device 10. FIGS. 2A and 2B are explanatory views schematically showing an internal structure of oral cavity washing device 10 according to the first exemplary embodiment. FIG. 2A is a front view of the internal structure of oral cavity washing device 10, and FIG. 2B is a side view of the internal structure of oral cavity washing device 10. As shown in FIGS. 1A, 1B, 2A and 2B, oral cavity washing device 10 is a hand-held oral cavity washing device that includes nozzle 20 and device body 30.

Figure 3:
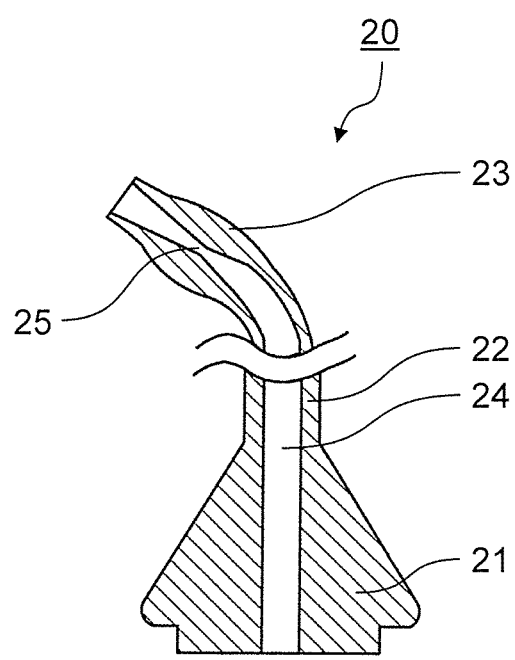
FIG. 3 is a schematic cross-sectional view showing a configuration of a nozzle of the oral cavity washing device according to the first exemplary embodiment.

FIG. 3 is a schematic cross-sectional view showing a configuration of nozzle 20 according to the first exemplary embodiment. As shown in FIGS. 1A to 3, detachable nozzle 20 is attached to an upper end of device body 30. Nozzle 20 is a component used to discharge a liquid (water) supplied from device body 30. Nozzle 20 includes detachable base 21 attached to device body 30, straight portion 22 linearly extending from base 21, and tip 23 extending so as to bend from an end of straight portion 22. In nozzle 20, nozzle flow passage 24, through which the liquid flows, is formed so as to pass through base 21, straight portion 22, and tip 23. A part of nozzle flow passage 24 corresponding to tip 23 has reduced part 25 that is smaller in cross-sectional area than a rest part of nozzle flow passage 24. Specifically, a cross-sectional area (an area of an opening) of reduced part 25 is made smaller than a cross-sectional area of a rest part in an axial view. Since nozzle flow passage 24 has a Venturi structure in this way, reduced part 25 causes the liquid to increase in flow velocity and decrease in pressure. When the pressure of the liquid falls to a saturated vapor pressure, part of the liquid changes into a gas and thus bubbles are generated inside the liquid. After the liquid goes through reduced part 25, the pressure of the liquid gradually rises. When the pressure of the liquid recovers to a level higher than or equal to the saturated vapor pressure, the bubbles inside the liquid change into a liquid. During this transition, the bubbles burst, and hence high shock waves are momentarily generated. These shock waves can be used for dirt removal inside an oral cavity. In other words, the oral cavity washing device enables a stream of water to contain bubbles and washes the oral cavity with the stream of water as well as by using shock waves generated in response to a burst of the bubbles. This enhances a washing effect inside the oral cavity.

As shown in FIGS. 1A, 1B, 2A and 2B, device body 30 is a component used to store a liquid and supply the liquid to nozzle 20. Specifically, device body 30 has an outside shape that is substantially cylindrical and measures such that the device body can be held by a user. In a lower part of device body 30, tank 31 is disposed to store the liquid. Lid 32 is attached to a back of device body 30 and is used to open or close an inlet (not shown) that communicates with tank 31. The user can store the liquid in tank 31 by opening lid 32 and injecting the liquid through the inlet.

A front of device body 30 is provided with power button 33 and adjustment button 34 for adjusting the pressure of the liquid discharged from nozzle 20. Power button 33 and adjustment button 34 are electrically connected to a controller that is not shown. The controller is, for example, a microcomputer and is built in device body 30. Device body 30 also has storage battery 35, motor 36, and pump 40 built-in. When power button 33 is turned on, electric power is supplied from storage battery 35 to the controller and motor 36. When power button 33 is turned off, the supply of electric power from storage battery 35 to motor 36 and pump 40 stops. When adjustment button 34 is operated, the controller adjusts output of motor 36 based on a signal sent from adjustment button 34. Since motor 36 is a driving source for pump 40, the output of motor 36 can be adjusted to adjust the pressure of the liquid discharged from nozzle 20.

Pump 40 supplies the liquid inside tank 31 to nozzle 20. Specifically, pump 40 is a piston pump and includes face gear 41, connecting rod 42, piston 43, and cylinder 44. Face gear 41 engages with pinion 37 mounted on an axis of rotation of motor 36. Thus, face gear 41 rotates by pinion 37 that rotates when motor 36 is driven. Connecting rod 42 is combined with face gear 41. Connecting rod 42 is positioned such that a rotation center of the connecting rod is off-center relative to a rotation center of face gear 41. This enables connecting rod 42 to move back and forth in response to the rotation of face gear 41. Piston 43 is attached to a distal end of connecting rod 42. Following the back-and-forth movement of connecting rod 42, piston 43 slides back and forth inside cylinder 44 in a vertical direction in FIG. 2 FIGS. 2A and 2B. Specifically, while piston 43 is going from a bottom dead center to a top dead center (hereinafter sometimes referred to as during discharge), internal pressure of cylinder 44 increases. While piston 43 is going from the top dead center to the bottom dead center (hereinafter sometimes referred to as during suction), the internal pressure of cylinder 44 decreases.

Device body 30 has supply passage 50 that supplies the liquid from tank 31 to nozzle 20. Supply passage 50 includes cylinder 44. Supply passage 50 also includes first supply passage 51 connecting cylinder 44 to nozzle 20 and second supply passage 52 connecting tank 31 to cylinder 44. First supply passage 51 incorporates flow passage module 60. In other words, flow passage module 60 is located downstream of cylinder 44.

Figure 4:
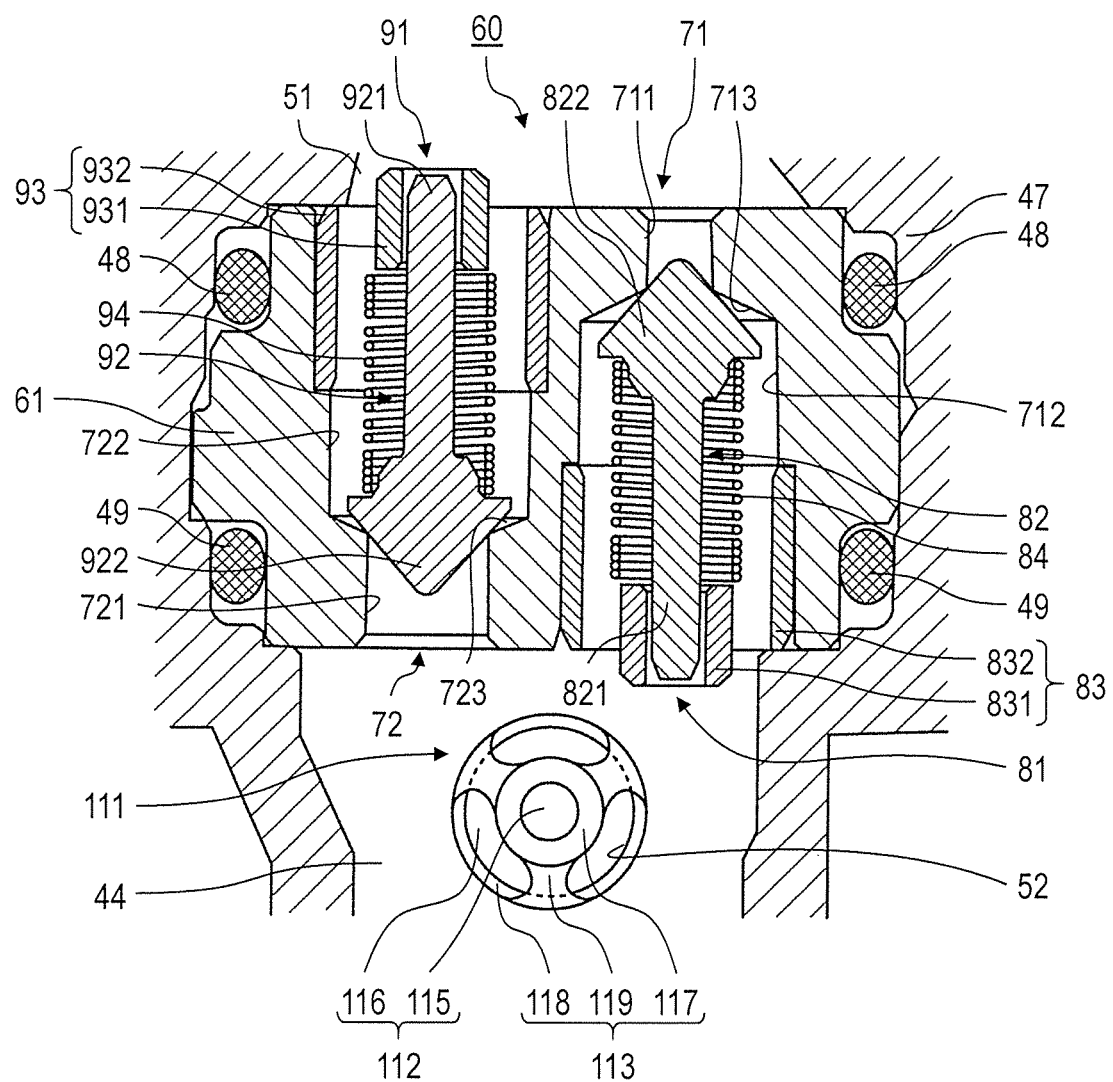
FIG. 4 is a schematic cross-sectional view showing a configuration of a flow passage module in the oral cavity washing device according to the first exemplary embodiment.
Figure 5:
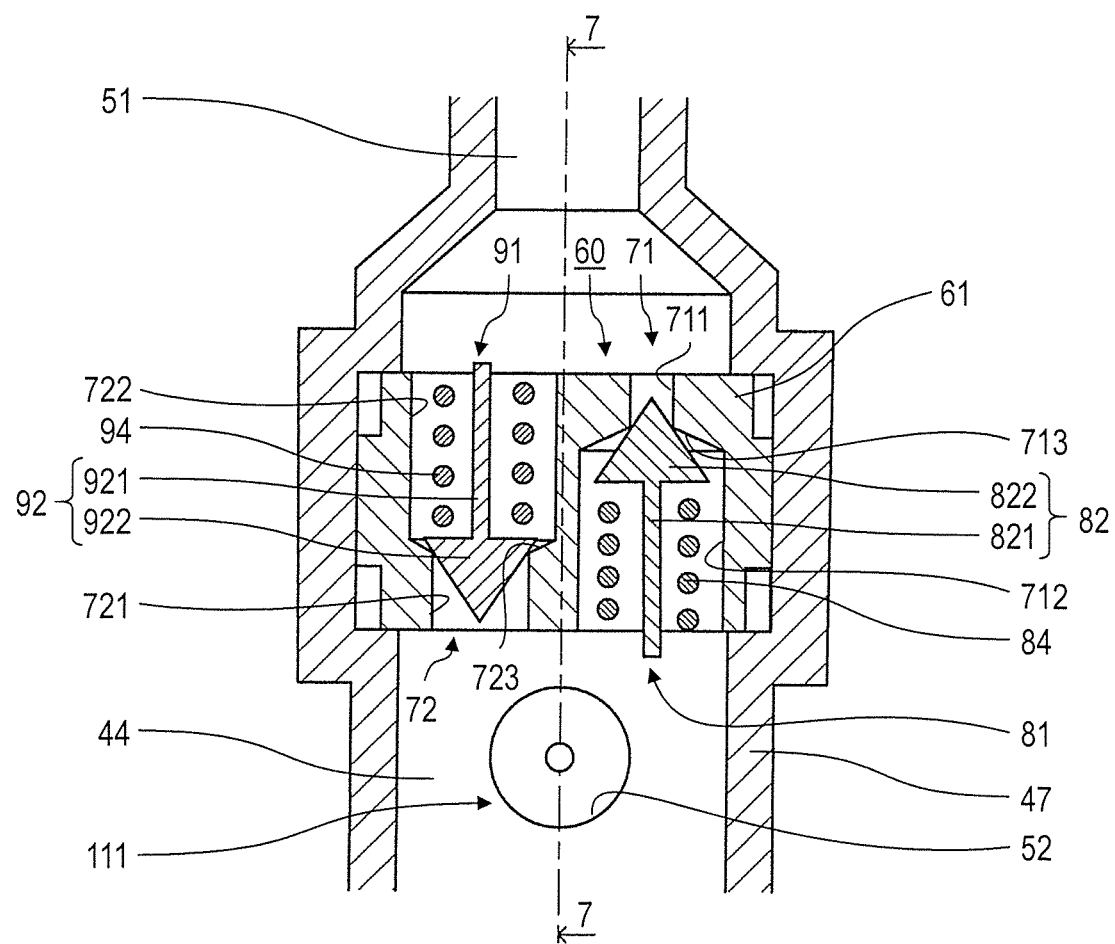
FIG. 5 is a schematic cross-sectional view schematically showing the configuration of the flow passage module in the oral cavity washing device according to the first exemplary embodiment.

FIG. 4 is a schematic cross-sectional view showing a configuration of flow passage module 60 according to the first exemplary embodiment. FIG. 5 is a schematic cross-sectional view schematically showing the configuration of flow passage module 60 according to the first exemplary embodiment. As shown in FIGS. 4 and 5, flow passage module 60 includes main body 61, first check valve 81, and second check valve 91. Main body 61 has first flow passage 71 and second flow passage 72 that are in parallel to each other. First flow passage 71 and second flow passage 72 each pass through main body 61 in the vertical direction, i.e., a direction connecting cylinder 44 to nozzle 20. Thus, a part of first supply passage 51 branches into first flow passage 71 and second flow passage 72. Main body 61 is disposed between cylinder 44 and nozzle 20 and is fitted onto structure 47 that makes up cylinder 44. In an outer-peripheral upper end and an outer-peripheral lower end of main body 61, grooves are formed so as to extend throughout the respective outer-peripheral ends, and O-rings 48, 49 are attached to the grooves. O-rings 48, 49 are disposed between main body 61 and structure 47 and are put into intimate contact with both main body 61 and structure 47. This prevents entry of the liquid into between an outer-peripheral surface of main body 61 and structure 47. In other words, the liquid flows into at least one of first flow passage 71 and second flow passage 72.

First flow passage 71 includes first small-diameter portion 711, first large-diameter portion 712, and first tapered portion 713. In first flow passage 71, first small-diameter portion 711, which is formed into a cylindrical shape, is located at a place adjacent to nozzle 20. In first flow passage 71, first large-diameter portion 712 is located at a place adjacent to cylinder 44 and is formed into a cylindrical shape that is larger in internal diameter than first small-diameter portion 711. In first flow passage 71, first tapered portion 713, which has a tapered inner peripheral surface, is located so as to connect first small-diameter portion 711 with first large-diameter portion 712.

Second flow passage 72 includes second small-diameter portion 721, second large-diameter portion 722, and second tapered portion 723. In second flow passage 72, second small-diameter portion 721, which is formed into a cylindrical shape, is located at a place adjacent to cylinder 44. In second flow passage 72, second large-diameter portion 722 is located at a place adjacent to nozzle 20 and is formed into a cylindrical shape that is larger in internal diameter than second small-diameter portion 721. In second flow passage 72, second tapered portion 723, which has a tapered inner peripheral surface, is located so as to connect second small-diameter portion 721 with second large-diameter portion 722.

First check valve 81 is an example of a first valve that is located in first flow passage 71 to open or close first flow passage 71. First check valve 81 includes first valve body 82, first holder 83, and first spring 84. First valve body 82 includes first shaft 821 and first conical part 822 that is formed on a distal end of first shaft 821 and that is formed into a tapered cone. A tip of first conical part 822 points toward nozzle 20. A proximal end of first conical part 822 has an external diameter that is larger than an internal diameter of first small-diameter portion 711 and smaller than an internal diameter of first large-diameter portion 712. A distal end of first conical part 822 has a diameter that is smaller than the internal diameter of first small-diameter portion 711. First conical part 822 formed in this way enables an outer peripheral surface of first conical part 822 to come into intimate line contact with an entire boundary between an inner peripheral surface of first small-diameter portion 711 and an inner peripheral surface of first tapered portion 713. When the outer peripheral surface is put into intimate contact with the boundary, first flow passage 71 is closed.

First holder 83 is a component designed to hold first valve body 82 such that the first valve body is allowed to freely move back and forth in an axial direction. Specifically, first holder 83 is a double annular component made up of first inner peripheral part 831 and first outer peripheral part 832 that are coupled to each other with a plurality of radially disposed couplers (not shown: see couplers 119 of third holder 113 shown in FIG. 4). First inner peripheral part 831 houses first shaft 821 of first valve body 82 inside. An inner peripheral surface of first inner peripheral part 831 guides back-and-forth movement of first shaft 821 of first valve body 82. First outer peripheral part 832 is fit into a part of main body 61 that constitutes first flow passage 71. Hence, an internal space of first outer peripheral part 832 constitutes a part of first large-diameter portion 712 in first flow passage 71.

Figure 6:
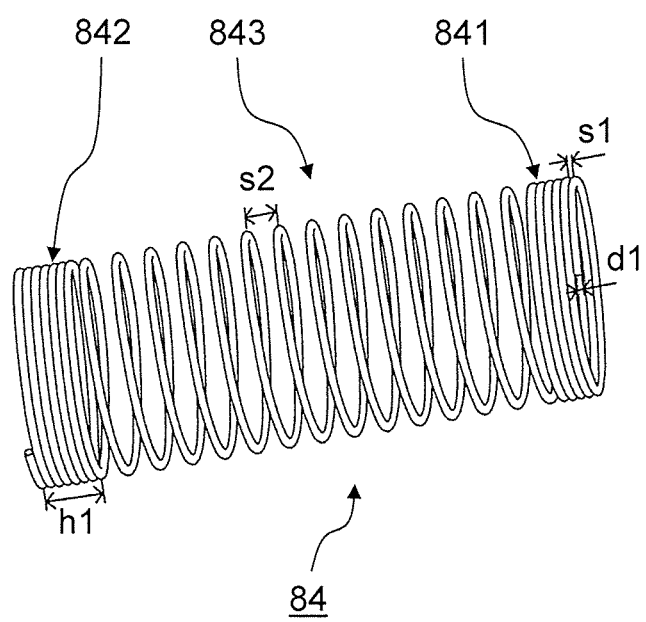
FIG. 6 is a schematic perspective view showing a configuration of a first spring in the oral cavity washing device according to the first exemplary embodiment.

FIG. 6 is a schematic perspective view showing a configuration of first spring 84 according to the first exemplary embodiment. Second spring 94 and third spring 114 described later are substantially similar in configuration to first spring 84.

As shown in FIG. 6, first spring 84 is a coil spring. First spring 84 includes first end coil part 841 that is a first end of first spring 84, second end coil part 842 that is a second end of first spring 84, and middle coil part 843 between first end coil part 841 and second end coil part 842. In first end coil part 841 and second end coil part 842, space s1 between adjacent spring wire turns is smaller than diameter d1 of a spring wire of first spring 84. Hence, during assembly for example, a spring wire of another coil spring (e.g., other first spring 84, second spring 94, and third spring 114) is less likely to come into space s1 between the spring wire turns in first end coil part 841 and second end coil part 842.

Width h1 of each of first end coil part 841 and second end coil part 842 along a longitudinal direction is greater than space s2 between adjacent spring wire turns in middle coil part 843. Hence, during assembly for example, any of a first end coil part and a second end coil part of another coil spring is less likely to come into space s2 between the spring wire turns in middle coil part 843. These characteristics hinder coil springs from getting entangled with each other and improve assembly workability.

As shown in FIGS. 4 and 5, first shaft 821 of first valve body 82 is inserted into first spring 84. The first end of first spring 84 is in contact with first conical part 822 of first valve body 82, whereas the second end of first spring 84 is in contact with first holder 83. In other words, first spring 84, which is disposed between first conical part 822 and first holder 83, applies a biasing force to first conical part 822 to urge the first conical part toward nozzle 20.

For instance, during discharge, the biasing force of first spring 84 causes first conical part 822 to move toward nozzle 20. Thus, the outer peripheral surface of first conical part 822 comes into intimate line contact with the entire boundary between the inner peripheral surface of first small-diameter portion 711 and the inner peripheral surface of first tapered portion 713 such that first flow passage 71 is closed. Meanwhile, during suction, the internal pressure of cylinder 44 decreases and hence first conical part 822 moves toward cylinder 44 while resisting first spring 84. Thus, first conical part 822 separates from the boundary between first small-diameter portion 711 and first tapered portion 713 such that first flow passage 71 is opened.

Second check valve 91 is an example of a second valve that is located in second flow passage 72 to open or close second flow passage 72. Second check valve 91 includes second valve body 92, second holder 93, and second spring 94. Second valve body 92 includes second shaft 921 and second conical part 922 that is formed on a distal end of second shaft 921 and that is formed into a tapered cone. A tip of second conical part 922 points toward cylinder 44. A proximal end of second conical part 922 has an external diameter that is larger than an internal diameter of second small-diameter portion 721 and smaller than an internal diameter of second large-diameter portion 722. A distal end of second conical part 922 has a diameter that is smaller than the internal diameter of second small-diameter portion 721. Second conical part 922 formed in this way enables an outer peripheral surface of second conical part 922 to come into intimate line contact with an entire boundary between an inner peripheral surface of second small-diameter portion 721 and an inner peripheral surface of second tapered portion 723. When the outer peripheral surface is put into intimate contact with the boundary, second flow passage 72 is closed.

Second holder 93 is a component designed to hold second valve body 92 such that the second valve body is allowed to freely move back and forth in an axial direction. Specifically, second holder 93 is a double annular component made up of second inner peripheral part 931 and second outer peripheral part 932 that are coupled to each other with a plurality of radially disposed couplers (not shown: see couplers 119 of third holder 113 shown in FIG. 4). Second inner peripheral part 931 houses second shaft 921 of second valve body 92 inside. An inner peripheral surface of second inner peripheral part 931 guides back-and-forth movement of second shaft 921 of second valve body 92.

Second outer peripheral part 932 is fit into a part of main body 61 that constitutes second flow passage 72. Hence, an internal space of second outer peripheral part 932 constitutes a part of second large-diameter portion 722 in second flow passage 72.

As shown in FIGS. 4 and 5, second shaft 921 of second valve body 92 is inserted into second spring 94. A first end of second spring 94 is in contact with second conical part 922 of second valve body 92, whereas a second end of second spring 94 is in contact with second holder 93. In other words, second spring 94, which is disposed between second conical part 922 and second holder 93, applies a biasing force to second conical part 922 to urge the second conical part toward cylinder 44.

For instance, during suction, the biasing force of second spring 94 causes second conical part 922 to move toward cylinder 44. Thus, the outer peripheral surface of second conical part 922 comes into intimate line contact with the entire boundary between the inner peripheral surface of second small-diameter portion 721 and the inner peripheral surface of second tapered portion 723 such that second flow passage 72 is closed. Meanwhile, during discharge, the internal pressure of cylinder 44 increases and hence second conical part 922 moves toward nozzle 20 while resisting second spring 94. Thus, second conical part 922 separates from the boundary between second small-diameter portion 721 and second tapered portion 723 such that second flow passage 72 is opened.

Next, second supply passage 52 will be described. As shown in FIG. 2B, second supply passage 52 is an example of a third flow passage used to guide the liquid to cylinder 44. One end member of second supply passage 52 adjacent to cylinder 44 includes structure 47, and a remaining portion of second supply passage 52 is made up of tube 99 (see FIGS. 2A and 2B) joined to structure 47. The one end member of second supply passage 52 adjacent to cylinder 44 is provided with third check valve 111.

Figure 7:
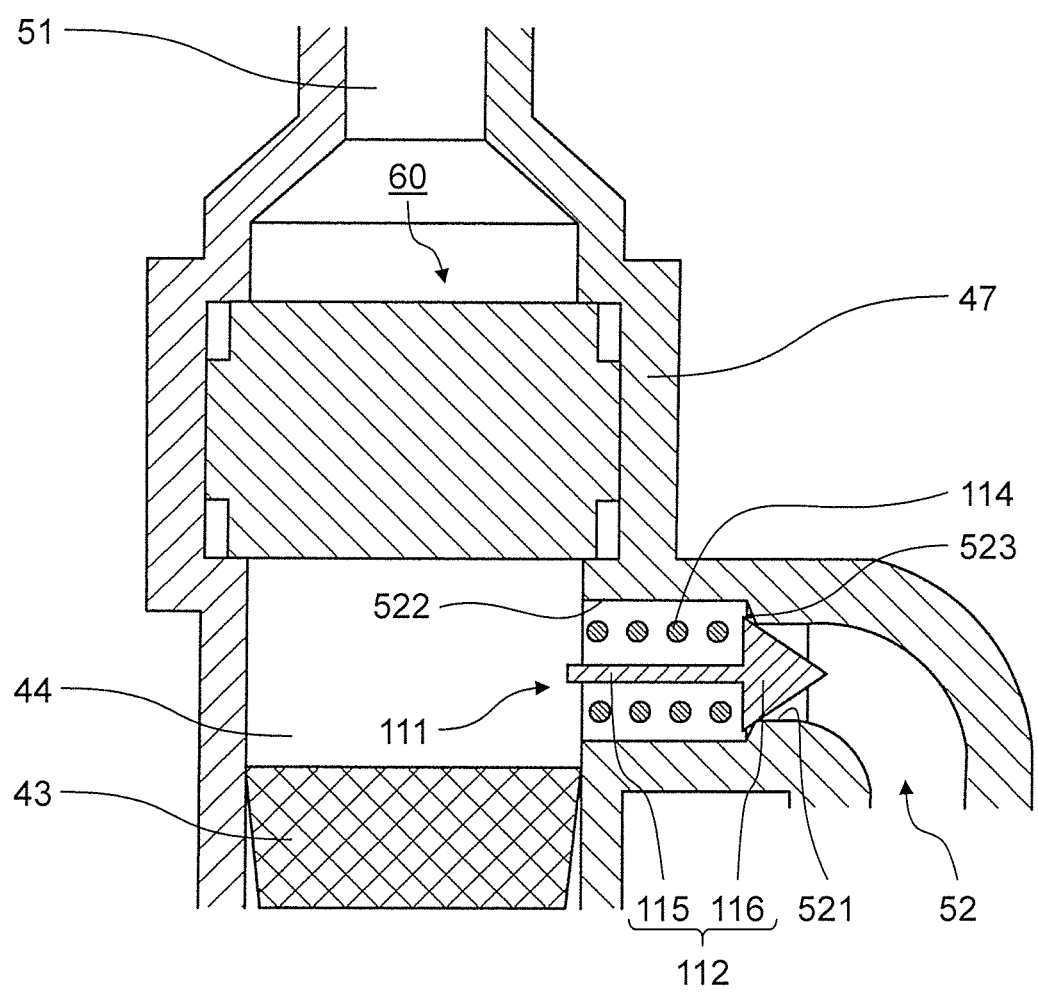
FIG. 7 is a schematic cross-sectional view schematically showing a configuration of a third check valve and a structure surrounding the third check valve in the oral cavity washing device according to the first exemplary embodiment.

FIG. 7 is a schematic cross-sectional view schematically showing a configuration of third check valve 111 and a structure surrounding the third check valve according to the first exemplary embodiment. Specifically, FIG. 7 is a cross-sectional view taken from line 7-7 of FIG. 5.

As shown in FIG. 7, the one end member of second supply passage 52 adjacent to cylinder 44 extends along a direction orthogonal to a direction in which piston 43 moves back and forth. FIG. 7 shows a state in which piston 43 is at the top dead center. In other words, the one end member of second supply passage 52 is disposed so as to be exposed to the cylinder even if piston 43 is located at the top dead center.

The one end member of second supply passage 52 includes third small-diameter portion 521, third large-diameter portion 522, and third tapered portion 523. In the one end member of second supply passage 52, third small-diameter portion 521, which is formed into a cylindrical shape, is located at a place remote from cylinder 44. A part of second supply passage 52 that is remoter from cylinder 44 than third small-diameter portion 521 is bends and then extends in the vertical direction to communicate with tank 31.

In the one end member of second supply passage 52, third large-diameter portion 522 is located at a place adjacent to cylinder 44 and is formed into a cylindrical shape that is larger in internal diameter than third small-diameter portion 521. In the one end member of second supply passage 52, third tapered portion 523, which has a tapered inner peripheral surface, is located so as to connect third small-diameter portion 521 with third large-diameter portion 522.

Third check valve 111 is located in the one end member of second supply passage 52 to open or close second supply passage 52. Third check valve 111 includes third valve body 112, third holder 113 (see FIG. 4), and third spring 114. Third valve body 112 includes third shaft 115 and third conical part 116 that is formed on a distal end of third shaft 115 and that is formed into a tapered cone. A tip of third conical part 116 points in a direction opposite to cylinder 44. A proximal end of third conical part 116 has an external diameter that is larger than an internal diameter of third small-diameter portion 521 and smaller than an internal diameter of third large-diameter portion 522. A distal end of third conical part 116 has a diameter that is smaller than the internal diameter of third small-diameter portion 521. Third conical part 116 formed in this way enables an outer peripheral surface of third conical part 116 to come into intimate line contact with an entire boundary between an inner peripheral surface of third small-diameter portion 521 and an inner peripheral surface of third tapered portion 523. When the outer peripheral surface is put into intimate contact with the boundary, second supply passage 52 is closed.

Third holder 113 shown in FIG. 4 is a component designed to hold third valve body 112 such that the third valve body is allowed to freely move back and forth in an axial direction. Specifically, third holder 113 is a double annular component made up of third inner peripheral part 117 and third outer peripheral part 118 that are coupled to each other with a plurality of couplers 119 disposed radially. Third inner peripheral part 117 houses third shaft 115 of third valve body 112 inside. An inner peripheral surface of third inner peripheral part 117 guides back-and-forth movement of third shaft 115 of third valve body 112. Third outer peripheral part 118 is fit into a part of structure 47 that constitutes the one end member of second supply passage 52. Hence, an internal space of third outer peripheral part 118 constitutes a part of third large-diameter portion 522 in second supply passage 52.

Third shaft 115 of third valve body 112 is inserted into third spring 114. A first end of third spring 114 is in contact with third conical part 116 of third valve body 112, whereas a second end of third spring 114 is in contact with third holder 113. In other words, third spring 114, which is disposed between third conical part 116 and third holder 113, applies a biasing force to third conical part 116 to urge the third conical part away from cylinder 44.

For instance, during discharge, the biasing force of third spring 114 causes third conical part 116 to move away from cylinder 44. Thus, the outer peripheral surface of third conical part 116 comes into intimate line contact with the entire boundary between the inner peripheral surface of third small-diameter portion 521 and the inner peripheral surface of third tapered portion 523 such that second supply passage 52 is closed. Meanwhile, during suction, the internal pressure of cylinder 44 decreases and hence third conical part 116 moves toward cylinder 44 while resisting third spring 114. Thus, third conical part 116 separates from the boundary between third small-diameter portion 521 and third tapered portion 523 such that second supply passage 52 is opened.

When pump 40 starts operation, air remains inside second supply passage 52. Thus, a negative pressure higher than that inside second supply passage 52 needs to be reliably generated in cylinder 44 during suction to suck up the liquid from tank 31. As described above, first flow passage 71 and second supply passage 52 are opened during suction. In this state, the pressure is negative inside cylinder 44 and thus, at the time of starting operation, the liquid is supplied from tank 31 into cylinder 44 through second supply passage 52 and air is supplied into cylinder 44 from nozzle flow passage 24 of nozzle 20 and first flow passage 71 through first supply passage 51 concurrently. The supply of the liquid into cylinder 44 is a requirement and it is not appropriate that an amount of the air supplied from first flow passage 71 is large.

Hence, in the present exemplary embodiment, a cross-sectional area of first small-diameter portion 711 of first flow passage 71 (a cross-sectional area in an axial view: an area of an opening) is made smaller than a cross-sectional area of third small-diameter portion 521 in second supply passage 52 to reduce an amount of air supplied from first flow passage 71 and efficiently suck up the liquid from second supply passage 52.

Specifically, the cross-sectional area of first small-diameter portion 711 is within a range from 2.25% to 49% inclusive of the cross-sectional area of third small-diameter portion 521. If that is converted from cross-sectional area to diameter, a diameter of first small-diameter portion 711 is within a range from 15% to 70% inclusive of a diameter of third small-diameter portion 521. If the cross-sectional area of first small-diameter portion 711 is less than 2.25% of the cross-sectional area of third small-diameter portion 521, the amount of air supplied from first flow passage 71 to cylinder 44 is small, which makes it difficult to draw in air to reduced part 25 in nozzle 20. Meanwhile, if the cross-sectional area of first small-diameter portion 711 is greater than 49% of the cross-sectional area of third small-diameter portion 521, the amount of air supplied from first flow passage 71 to cylinder 44 is large and thus it takes a substantial length of time until the liquid is sucked up from tank 31 to cylinder 44 at the time of starting the operation of pump 40. Since the cross-sectional area of first small-diameter portion 711 is within the above-described range, the oral cavity washing device is able to suck up the liquid from tank 31 to cylinder 44 at high speed at the time of starting operation while appropriately controlling the amount of air supplied from first flow passage 71 to cylinder 44.

Even when the cross-sectional area of first small-diameter portion 711 is smaller than the cross-sectional area of third small-diameter portion 521, an elastic force of first spring 84 that is weaker than an elastic force of third spring 114 is likely to cause first check valve 81 alone to be opened and third check valve 111 to be closed during suction. Hence, if the cross-sectional area of first small-diameter portion 711 is smaller than the cross-sectional area of third small-diameter portion 521, the elastic force of first spring 84 is specified to be greater than or equal to the elastic force of third spring 114 to reliably enable both first and third check valves 81 and 111 to be opened during suction.

Operation

Figure 8A:
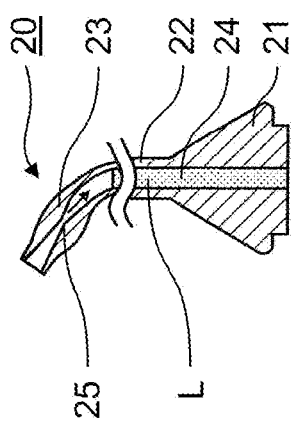
FIGS. 8A, 8B and 8C are explanatory views showing states of the components of the oral cavity washing device according to the first exemplary embodiment during suction.
Figure 8C:
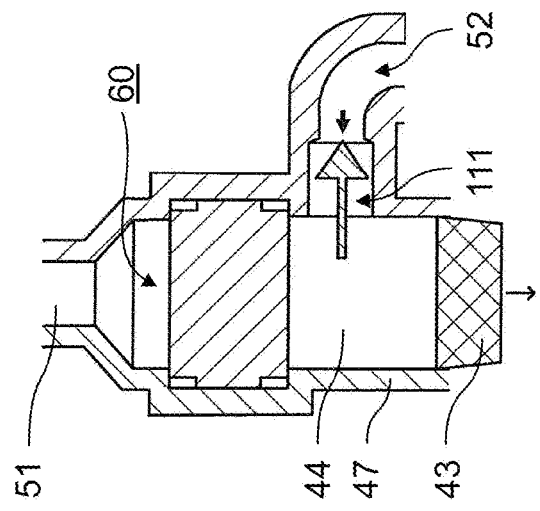
Figure 8B:
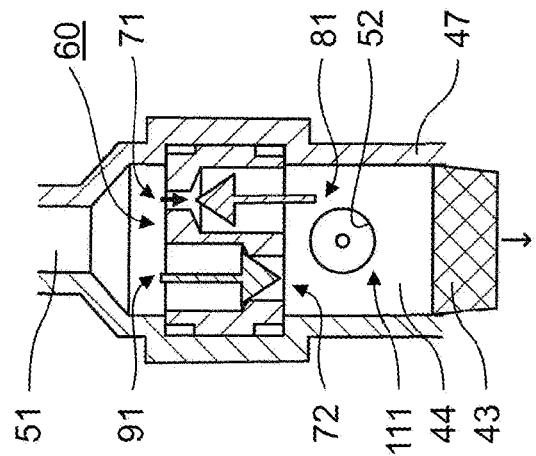

Next, operation of oral cavity washing device 10 will be described. The following description illustrates a case in which the liquid is filled to the tip of nozzle 20 after a lapse of a certain period of time following the start of operation of pump 40. FIGS. 8A, 8B and 8C are explanatory views showing states of the components of oral cavity washing device 10 according to the first exemplary embodiment during suction. FIGS. 9A, 9B and 9C are explanatory views showing states of the components of oral cavity washing device 10 according to the first exemplary embodiment during discharge. FIG. 8A and FIG. 9A are cross-sectional views showing states inside nozzle 20. FIG. 8B and FIG. 9B are cross-sectional views showing states inside flow passage module 60. FIG. 8C and FIG. 9C are cross-sectional views showing states inside the one end member of second supply passage 52. In FIG. 8A and FIG. 9A, liquid L is shown and in the remaining drawings, illustration of the liquid is omitted.

As shown in FIG. 8C, the internal pressure of cylinder 44 decreases and the cylinder 44 is put under negative pressure during suction. Thus, third check valve 111 causes second supply passage 52 to be opened. This allows liquid L to be supplied from tank 31 into cylinder 44 through second supply passage 52.

During suction, as shown in FIG. 8B, first check valve 81 causes first flow passage 71 to be opened and second check valve 91 causes second flow passage 72 to be closed in flow passage module 60. Thus, liquid L filling nozzle flow passage 24 of nozzle 20 flows backward and is drawn into cylinder 44 from first flow passage 71 through first supply passage 51 due to the negative pressure inside cylinder 44. As a result, as shown in FIG. 8A, air is drawn into nozzle 20 from a distal end of nozzle flow passage 24 to a place downstream of reduced part 25.

Next, during discharge, as shown in FIG. 9C, the internal pressure of cylinder 44 increases and thus third check valve 111 causes second supply passage 52 to be closed. During discharge, as shown in FIG. 9B, first check valve 81 causes first flow passage 71 to be closed and second check valve 91 causes second flow passage 72 to be opened in flow passage module 60. Thus, liquid L is compressed inside cylinder 44, flows energetically into nozzle flow passage 24 of nozzle 20 from second flow passage 72 through first supply passage 51, and is discharged from the tip of nozzle 20. As described above, air is drawn in to a place downstream of reduced part 25 during suction, the air drawn into nozzle flow passage 24 of nozzle 20 is caught by energetic liquid L such that a large number of bubbles B are generated in liquid L. Reduced part 25 causes liquid L to increase in flow velocity and decrease in pressure. When the pressure of liquid L falls to a saturated vapor pressure, part of liquid L changes into a gas and thus bubbles B are generated inside liquid L. In this way, bubbles B due to reduced part 25 and bubbles B resulting from air that has already been drawn into nozzle 20 are generated in liquid L. Liquid L is discharged from the tip of nozzle 20 and reaches an oral cavity to wash the oral cavity with a stream of the liquid. During this process, bubbles B burst, and shock waves are thereby generated. The shock waves also remove dirt inside the oral cavity to enhance an overall washing effect.

Comparative Example

Figure 10A:
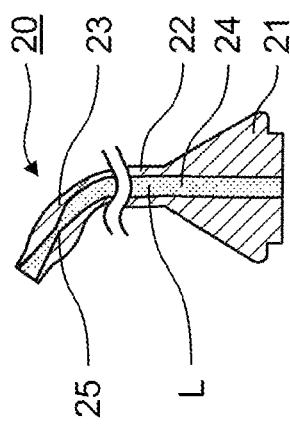
FIGS. 10A, 10B and 10C are explanatory views showing states of components of an oral cavity washing device according to a comparative example during suction.
Figure 10C:
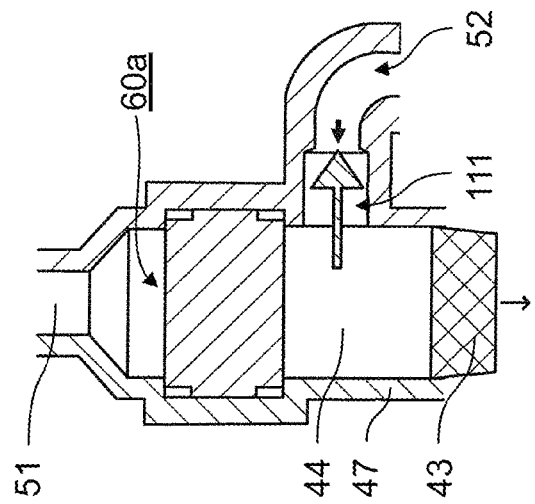
Figure 10B:
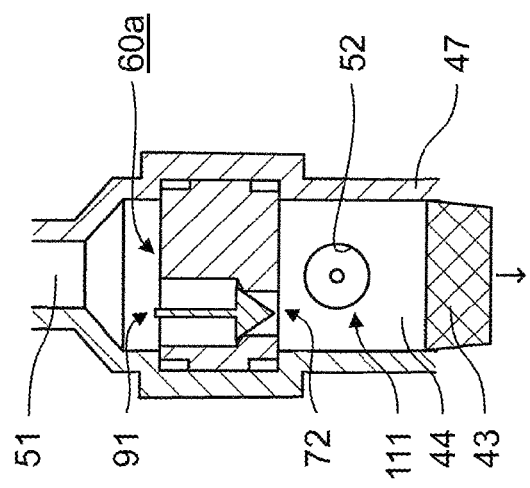
Figure 11A:
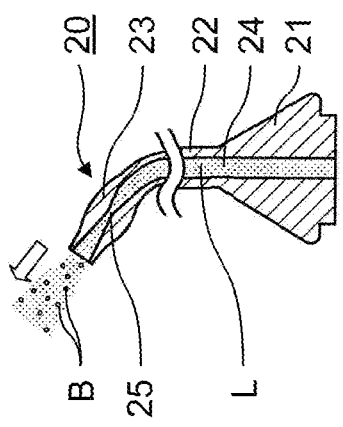
FIGS. 11A, 11B and 11C are explanatory views showing states of the components of the oral cavity washing device according to the comparative example during discharge.
Figure 11C:
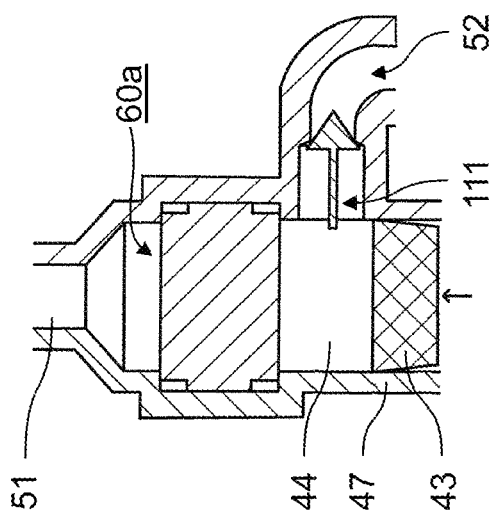
Figure 11B:
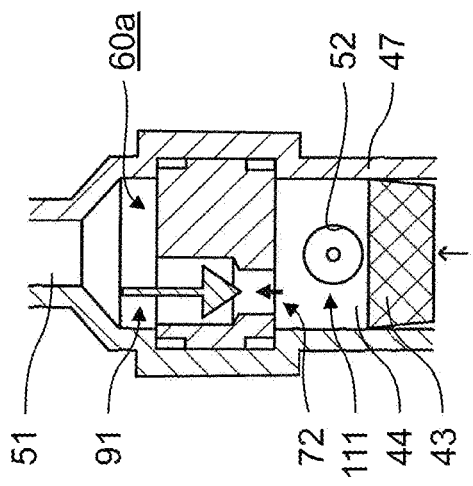

Next, a comparative example will be described. The description of the comparative example also illustrates a case in which liquid is filled to a tip of nozzle 20 after a lapse of a certain period of time following the start of operation of pump 40. FIGS. 10A, 10B and 10C are explanatory views showing states of components of an oral cavity washing device according to the comparative example during suction. FIGS. 11A, 11B and 11C are explanatory views showing states of the components of the oral cavity washing device according to the comparative example during discharge. FIG. 10A and FIG. 11A are cross-sectional views showing states inside nozzle 20. FIG. 10B and FIG. 11B are cross-sectional views showing states inside flow passage module 60. FIG. 10C and FIG. 11C are cross-sectional views showing states inside one end member of second supply passage 52. In FIG. 10A and FIG. 11A, liquid L is shown and in the remaining drawings, illustration of the liquid is omitted.

The oral cavity washing device according to the comparative example differs from oral cavity washing device 10 according to the first exemplary embodiment in that flow passage module 60a does not include first flow passage 71 and first check valve 81. In other respects, the oral cavity washing device of the comparative example is similar to oral cavity washing device 10 of the first exemplary embodiment. Thus, in the description of the comparative example, parts identical to those of oral cavity washing device 10 of the first exemplary embodiment are assigned with the same reference numerals, and descriptions thereof will be omitted.

As shown in FIG. 10C, the internal pressure of cylinder 44 decreases and the cylinder 44 is put under negative pressure during suction. Thus, third check valve 111 causes second supply passage 52 to be opened. This allows liquid L to be supplied from tank 31 into cylinder 44 through second supply passage 52. During suction, as shown in FIG. 10B, second check valve 91 causes second flow passage 72 to be closed in flow passage module 60a. In other words, as shown in FIG. 10A, nozzle flow passage 24 in nozzle 20 is filled with liquid L.

Next, during discharge, as shown in FIG. 11C, the internal pressure of cylinder 44 increases and thus third check valve 111 causes second supply passage 52 to be closed. During discharge, as shown in FIG. 11B, second check valve 91 causes second flow passage 72 to be opened in flow passage module 60a. Thus, liquid L is compressed inside cylinder 44, flows energetically into nozzle flow passage 24 of nozzle 20 from second flow passage 72 through first supply passage 51, and is discharged from the tip of nozzle 20. Liquid L, at a time of passing through reduced part 25, increases in flow velocity and decreases in pressure. When the pressure of liquid L falls to a saturated vapor pressure, part of liquid L changes into a gas and thus bubbles B are generated inside liquid L. However, since no air is drawn into nozzle flow passage 24 of nozzle 20, a quantity of generated bubbles B is smaller than that in oral cavity washing device 10 according to the first exemplary embodiment.

Effects

As described above, oral cavity washing device 10 according to the present exemplary embodiment includes nozzle 20 and pump 40 that supplies liquid L to nozzle 20. Nozzle 20 has nozzle flow passage 24 and reduced part 25 that is disposed in an intermediate part of nozzle flow passage 24 and that is smaller in cross-sectional area than a rest of nozzle flow passage 24. First flow passage 71 and second flow passage 72 that are in parallel to each other are disposed between nozzle 20 and pump 40. First flow passage 71 has first check valve 81 (a first valve) that causes first flow passage 71 to be opened only when pump 40 sucks the liquid. Second flow passage 72 has second check valve 91 (a second valve) that causes second flow passage 72 to be opened only during discharge performed by pump 40.

During suction performed by pump 40, first check valve 81 causes first flow passage 71 to be opened and thus the oral cavity washing device is allowed to suck in air from the tip of nozzle 20 to a place downstream of reduced part 25. After that, during discharge performed by pump 40, first check valve 81 causes first flow passage 71 to be closed and second check valve 91 causes second flow passage 72 to be opened. Thus, liquid L flows energetically from pump 40 into nozzle flow passage 24 of nozzle 20 and is discharged from the tip of nozzle 20. Until immediately before discharge, air has been drawn in to the place downstream of reduced part 25 and hence the air is caught by energetic liquid L such that a large number of bubbles B are generated in liquid L. Reduced part 25 causes liquid L to increase in flow velocity and decrease in pressure. When the pressure of liquid L falls to a saturated vapor pressure, part of liquid L changes into a gas and thus bubbles B are generated inside liquid L. In this way, bubbles B due to reduced part 25 and bubbles B resulting from air that has already been drawn into nozzle 20 are generated in liquid L. When liquid L is discharged from the tip of nozzle 20, many bubbles B burst, resulting in the generation of many shock waves. The shock waves are transmitted to an oral cavity and thereby facilitate the removal of dirt inside the oral cavity. Oral cavity washing device 10 configured in this way according to the present exemplary embodiment is able to discharge liquid L containing an increased number of bubbles B and provides improved washing performance.

The first valve and the second valve are check valves that allow the liquid to flow in opposite directions.

According to this configuration, since the first valve is first check valve 81 and the second valve is second check valve 91, pump 40 can be driven to open first check valve 81 and close second check valve 91 and vice versa at different timings without electrical control.

First flow passage 71, first check valve 81, second flow passage 72, and second check valve 91 are combined into a module.

According to this configuration, first flow passage 71, first check valve 81, second flow passage 72, and second check valve 91 are combined into a module to make up flow passage module 60. Thus, simply mounting flow passage module 60 onto structure 47 is satisfactory in manufacturing the oral cavity washing device. This contributes to improved workability in assembly and maintenance.

Flow passage module 60 is provided with a watertight structure such as O-rings 48, 49 (see FIG. 4). This allows the oral cavity washing device to readily maintain watertightness between structure 47 and flow passage module 60.

Oral cavity washing device 10 includes second supply passage 52 (a third flow passage) to guide liquid L to cylinder 44 of pump 40 and third check valve 111 (a third valve) disposed in second supply passage 52 to cause second supply passage 52 to be opened only when pump 40 sucks the liquid. A cross-sectional area of first flow passage 71 is smaller than a cross-sectional area of second supply passage 52.

Since the cross-sectional area of first flow passage 71 is smaller than the cross-sectional area of second supply passage 52, the oral cavity washing device is able to reliably suck up liquid L from tank 31 to cylinder 44 at the time of starting the operation of pump 40.

The cross-sectional area of first flow passage 71 ranges from 2.25% to 49% inclusive of the cross-sectional area of second supply passage 52.

Since the cross-sectional area of first flow passage 71 ranges from 2.25% to 49% inclusive of the cross-sectional area of second supply passage 52, the oral cavity washing device is able to suck up the liquid from tank 31 to cylinder 44 at high speed at the time of starting operation while appropriately controlling the amount of air supplied from first flow passage 71 to cylinder 44.

The elastic force of first spring 84 (see FIGS. 4 and 5) included in first check valve 81 is greater than or equal to the elastic force of third spring 114 (see FIG. 7) included in third check valve 111.

If the cross-sectional area of first flow passage 71 is smaller than the cross-sectional area of second supply passage 52, the elastic force of first spring 84 is specified to be greater than or equal to the elastic force of third spring 114. This configuration reliably enables both first check valve 81 and third check valve 111 to be opened during suction. Coil springs with an identical elastic force may be adopted for first and third springs 84 and 114, enabling standardization of parts.

Second Exemplary Embodiment

In the first exemplary embodiment, valve bodies (first valve body 82, second valve body 92, and third valve body 112) of all of first check valve 81, second check valve 91, and third check valve 111 come into line contact with the inner peripheral surfaces of open-close subjects (first flow passage 71, second flow passage 72, and second supply passage 52) respectively, for example. In the following description, an oral cavity washing device of a second exemplary embodiment adjusts areas of contact between first check valve 81, second check valve 91, third check valve 111 and respective open-close subjects. In the description given hereinafter, parts identical to those of the above-described first exemplary embodiment are assigned with the same reference numerals, and descriptions thereof may be omitted.

Figure 12:
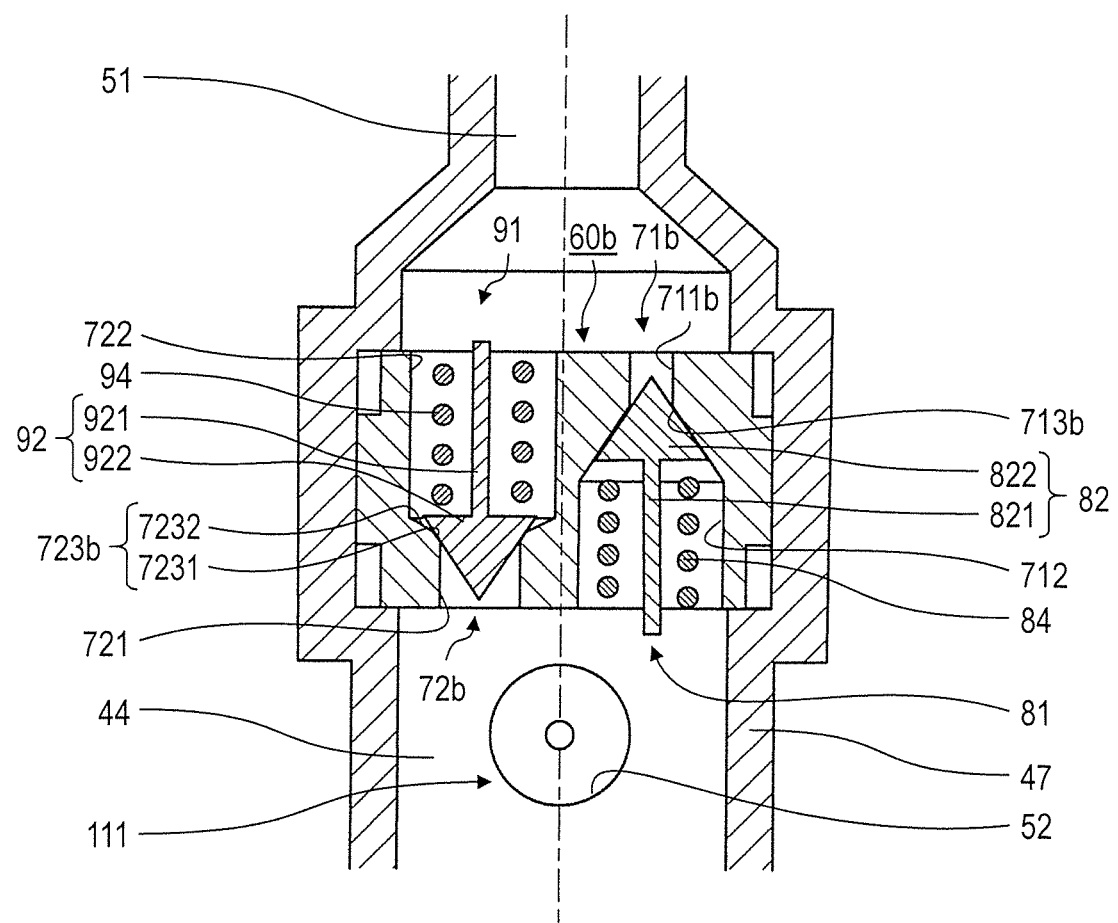
FIG. 12 is a schematic cross-sectional view schematically showing a configuration of a flow passage module in an oral cavity washing device according to a second exemplary embodiment.

FIG. 12 is a schematic cross-sectional view schematically showing a configuration of flow passage module 60b in the oral cavity washing device according to the second exemplary embodiment. Specifically, FIG. 12 is a drawing corresponding to FIG. 5, which shows flow passage module 60 in the oral cavity washing device according to the first exemplary embodiment. As shown in FIG. 12, first check valve 81 and second check valve 91 are similar to first check valve 81 and second check valve 91 of the first exemplary embodiment. However, first flow passage 71b and second flow passage 72b are different from first flow passage 71 and second flow passage 72 of the first exemplary embodiment.

Specifically, first small-diameter portion 711b of first flow passage 71b is made smaller in internal diameter than first small-diameter portion 711 according to the first exemplary embodiment. First tapered portion 713b of first flow passage 71b is formed so as to have a cone angle equivalent to a cone angle of first conical part 822 of first check valve 81. Thus, when the first flow passage is closed with first check valve 81, first conical part 822 is put into surface contact with an inner peripheral surface of first tapered portion 713b. "Equivalent" used herein represents exact match as well as a difference of several percent. Even if a difference of several percent exists between the cone angles, first conical part 822 is pressed against the inner peripheral surface of first tapered portion 713b by first spring 84 and thus is put into surface contact with all the inner peripheral surface of first tapered portion 713b. This similarly applies to every "equivalent" used in the present disclosure.

Second tapered portion 723b of second flow passage 72b has an inner peripheral surface that is formed into a two-tiered tapered shape. Second tapered portion 723b has first tier 7231 contiguous to second small-diameter portion 721 and second tier 7232 contiguous to second large-diameter portion 722. First tier 7231 and second tier 7232 are contiguous to each other. First tier 7231 is made smaller in internal diameter than second tier 7232. First tier 7231 and second tier 7232 are each formed into a tapered shape. In second tapered portion 723b, a cone angle of first tier 7231 adjacent to the small-diameter portion is narrower than a cone angle of second tier 7232 adjacent to the large-diameter portion.

When the second flow passage is closed with second check valve 91, second conical part 922 is put into surface contact with an inner peripheral surface of first tier 7231. Hence, the cone angle of first tier 7231 is specified to be equivalent to a cone angle of second conical part 922. Even if a difference of several percent exists between the cone angles, second conical part 922 is pressed against the inner peripheral surface of first tier 7231 by second spring 94 and thus is put into surface contact with all the inner peripheral surface of first tier 7231. A second contact area between second check valve 91 and the inner peripheral surface of second flow passage 72b is specified to be smaller than a first contact area between first check valve 81 and the inner peripheral surface of first flow passage 71b.

Figure 13:
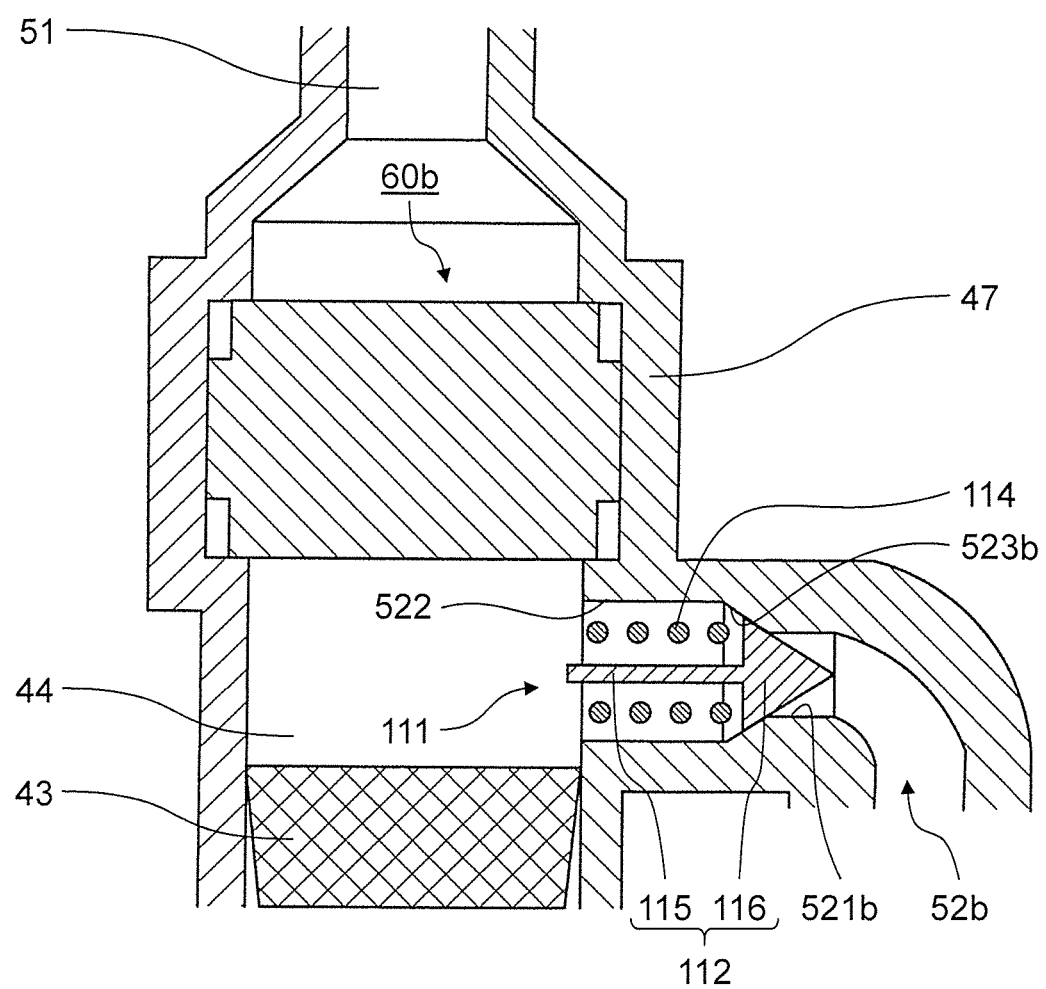
FIG. 13 is a schematic cross-sectional view schematically showing a configuration of a third check valve and a structure surrounding the third check valve in the oral cavity washing device according to the second exemplary embodiment.

FIG. 13 is a schematic cross-sectional view schematically showing a configuration of third check valve 111 and a structure surrounding the third check valve in the oral cavity washing device according to the second exemplary embodiment. Specifically, FIG. 13 is a drawing corresponding to FIG. 7, which shows third check valve 111 and a structure surrounding the third check valve in the oral cavity washing device according to the first exemplary embodiment. As shown in FIG. 13, third check valve 111 is similar to third check valve 111 of the first exemplary embodiment. However, one end member of second supply passage 52b is different from the one end member of second supply passage 52 of the first exemplary embodiment.

Specifically, third small-diameter portion 521b in second supply passage 52b is made smaller in internal diameter than third small-diameter portion 521 of the first exemplary embodiment. In this case as well, it is preferred that a cross-sectional area of third small-diameter portion 521b be larger than a cross-sectional area of first small-diameter portion 711b of first flow passage 71b to efficiently suck up liquid L.

Third tapered portion 523b in second supply passage 52b is designed to have a cone angle equivalent to that of first tapered portion 713b of first flow passage 71b. The cone angle of third tapered portion 523b in second supply passage 52b is specified to be equivalent to a cone angle of third conical part 116. In other words, the cone angle of third conical part 116 is equivalent to the cone angle of first conical part 822. This enables standardization of first valve body 82 and third valve body 112. Second valve body 92 can also be standardized to share design features with first valve body 82 and third valve body 112.

Third conical part 116 is pressed against an inner peripheral surface of third tapered portion 523b by third spring 114 and thus is put into surface contact with the inner peripheral surface of third tapered portion 523b. A third contact area between third check valve 111 and the inner peripheral surface of second supply passage 52b is specified to be larger than the second contact area between second check valve 91 and the inner peripheral surface of second flow passage 72b.

It is desirable that the contact areas (the first contact area, the second contact area, and the third contact area) between first check valve 81, second check valve 91, third check valve 111 and the respective open-close subjects be appropriately specified to improve stability for the discharge of liquid L.

If sealing performance of first check valve 81 is unstable, the liquid flows irregularly through first flow passage 71b that is closed as well as opened second flow passage 72b during discharge. This makes an overall flow of the liquid unstable, resulting in unstable discharge pressure. Thus, first check valve 81 is required to provide high sealing performance. Meanwhile, an increase in sealing performance accordingly raises the likelihood that the first check valve gets stuck. For instance, even if first check valve 81 is stuck and unable to operate, the liquid is drawn into pump 40 and is discharged from second check valve 91. Thus, the liquid circulates in pump 40, first flow passage 71b, and second flow passage 72b without problems. Stuck first check valve 81 comes unstuck by circulation of the liquid and hence no problem arises ultimately even if first check valve 81 gets stuck.

Third check valve 111 needs to be reliably put into intimate contact with the inner peripheral surface of second supply passage 52b during discharge to increase the pressure inside cylinder 44, and hence it is preferable that sealing performance of third check valve 111 be high. An increase in sealing performance as well accordingly raises the likelihood that third check valve 111 gets stuck. Nevertheless, in the same way as the first exemplary embodiment described above, the cross-sectional area of third small-diameter portion 521b in supply passage 52b (a cross-sectional area in an axial view: an area of an opening) is made larger than the cross-sectional area of first small-diameter portion 711b of first flow passage 71b, and the area of contact of third check valve 111 is thereby smaller than the area of contact of first check valve 81. As a result, the likelihood that third check valve 111 gets stuck is not as high as the likelihood that first check valve 81 gets stuck.

If second check valve 91 is stuck, air inside pump 40 cannot be released. This prevents the liquid inside tank 31 from being sucked up into pump 40 and the oral cavity washing device is unable to start discharging the liquid. Thus, it is important that the second check valve does not get stuck. Accordingly, an area of contact of second check valve 91 is specified to be smaller than the areas of contact of first and third check valves 81 and 111 to decrease the likelihood of the second check valve getting stuck and ensure necessary sealing performance. Hence, in the second exemplary embodiment, the areas of contact of the check valves are specified based on sealing performance levels required for the respective check valves. Specifically, as described above, a relationship of the first contact area>the third contact area>the second contact area is satisfied.

Effects

As described above, the oral cavity washing device according to the present exemplary embodiment includes nozzle 20 and pump 40 used to supply liquid L to nozzle 20. Nozzle 20 has nozzle flow passage 24 and reduced part 25 that is disposed in an intermediate part of nozzle flow passage 24 and that is smaller in cross-sectional area than the other part of the nozzle flow passage. First flow passage 71b and second flow passage 72b that are in parallel to each other are disposed between nozzle 20 and pump 40. First flow passage 71b has first check valve 81 that causes first flow passage 71b to be opened only when pump 40 sucks the liquid. Second flow passage 72b has second check valve 91 that allows fluid to flow in a direction opposite to a flow direction of first check valve 81 and that causes second flow passage 72b to be opened only during discharge performed by pump 40. Moreover, the first contact area between first check valve 81 and the inner peripheral surface of first flow passage 71b is larger than the second contact area between second check valve 91 and the inner peripheral surface of second flow passage 72b.

Since the first area of contact of first check valve 81 is larger than the second area of contact of second check valve 91, first check valve 81 provides sealing performance higher than that of second check valve 91. This ensures a stable flow of the liquid and stable discharge pressure during discharge. Consequently, the oral cavity washing device is able to stably discharge liquid L containing an increased number of bubbles and provides improved washing performance.

The oral cavity washing device according to the present exemplary embodiment includes second supply passage 52 (a third flow passage) to guide liquid L to cylinder 44 of pump 40 and third check valve 111 disposed in second supply passage 52 to cause second supply passage 52 to be opened only when the pump 40 sucks the liquid. Moreover, the third contact area between third check valve 111 and the inner peripheral surface of second supply passage 52 is larger than the second contact area between second check valve 91 and the inner peripheral surface of second flow passage 72b.

Since the third area of contact of third check valve 111 is larger than the second area of contact of second check valve 91, third check valve 111 provides sealing performance higher than that of second check valve 91. This enables third check valve 111 to be reliably put into intimate contact with the inner peripheral surface of second supply passage 52 and ensures high pressure inside cylinder 44 during discharge. Consequently, the oral cavity washing device is able to discharge liquid L with increased stability.

First check valve 81 has first conical part 822 that is formed into a cone to open or close first flow passage 71b, and first flow passage 71b has first tapered portion 713b that has a tapered surface. First conical part 822 is put into surface contact with the inner peripheral surface of first tapered portion 713b adjacent to the small-diameter portion.

First conical part 822 of first check valve 81 is put into surface contact with the inner peripheral surface of first tapered portion 713b adjacent to the small-diameter portion. The simple configuration provides the surface contact.

Second check valve 91 has second conical part 922 that is formed into a cone to open or close second flow passage 72b, and second flow passage 72b has second tapered portion 723b that is formed into a tapered shape so as to have two tiers. One of the tiers adjacent to the small-diameter portion is narrower in cone angle than the other tier adjacent to the large-diameter portion. Second conical part 922 is put into surface contact with the inner peripheral surface of second tapered portion 723b adjacent to the small-diameter portion.

Second conical part 922 of second check valve 91 is put into surface contact with the inner peripheral surface of second tapered portion 723b adjacent to the small-diameter portion. The simple configuration provides the surface contact.

Third check valve 111 has third conical part 116 that is formed into a cone to open or close second supply passage 52b, and second supply passage 52b has third tapered portion 523b that has a tapered surface. Third conical part 116 is put into surface contact with the inner peripheral surface of third tapered portion 523b.

Third conical part 116 of third check valve 111 is put into surface contact with the inner peripheral surface of third tapered portion 523b. The simple configuration provides the surface contact.

First tapered portion 713b, third tapered portion 523b, first conical part 822, and third conical part 116 each have an identical cone angle. An end of first tapered portion 713b adjacent to the small-diameter portion is smaller in cross-sectional area than an end of third tapered portion 523b adjacent to the small-diameter portion.

This simple configuration ensures a difference between the first area of contact of first check valve 81 and the third area of contact of third check valve 111.

According to the configuration described above, the shapes of the inner peripheral surfaces of the open-close subjects are adjusted to adjust the first contact area, the second contact area, and the third contact area. In other words, even if first valve body 82, second valve body 92, and third valve body 112 are identical parts, the relationship among the contact areas can be satisfied. To put it another way, this configuration enables standardization of first valve body 82, second valve body 92, and third valve body 112 and contributes to a reduction in manufacturing cost.

Third Exemplary Embodiment

In the first exemplary embodiment described above, first flow passage 71 is smaller in cross-sectional area than second supply passage 52, for example. However, the cross-sectional area of the first flow passage may be larger than or equal to the cross-sectional area of the second supply passage. In this case, if no measure is taken, it is difficult to suck up the liquid inside the tank into the cylinder because of a large quantity of air supplied from the first flow passage to the cylinder. To address this challenge, the elastic force of the first spring included in the first check valve may be specified to be greater than the elastic force of the third spring included in the third check valve. If the elastic force of the first spring is greater than that of the third spring, the first check valve switches to be opened at a later timing than the third check valve does during suction performed by the pump. This makes the quantity of air supplied from the first flow passage to the cylinder smaller than the quantity of liquid L supplied from the second supply passage to the cylinder and enables the oral cavity washing device to reliably suck up the liquid from the tank into the cylinder.

Others

The oral cavity washing devices according to the exemplary embodiments of the present disclosure have been described above. However, the present disclosure is not limited to the above exemplary embodiments.

For instance, in the first exemplary embodiment described above, a piston pump is exemplified as the pump. However, the pump may be a diaphragm pump, a plunger pump, or any other reciprocating pump, for example.

In the first exemplary embodiment described above, a hand-held oral cavity washing device is exemplified as oral cavity washing device 10. However, the oral cavity washing device may be a tabletop oral cavity washing device.

In the first exemplary embodiment described above, the first valve, the second valve, and the third valves are each a check valve having a conical part, for example. However, the check valve may have any structure, with proviso that the check valve has a function of backflow prevention. For instance, the check valve may include a plate-shaped cover that opens and closes. An elastic body such as rubber or an elastomer other than the coil spring may apply a biasing force to the valve body, for example. The shapes of the first flow passage, the second flow passage, and the third flow passage may be appropriately changed depending on the structure of the check valves. Thus, the first flow passage, the second flow passage, and the third flow passage may have any cross-sectional shape (an opening shape) other than the circle.

In the first exemplary embodiment described above, all of the first valve, the second valve, and the third valves are check valves, for example. However, the first valve, the second valve, and the third valves may be electromagnetic valves. If the valves are electromagnetic valves, the controller controls timing at which to open or close each of the first valve, the second valve, and the third valves to ensure that the first and the third valves are opened only when the pump sucks the liquid and that the second valve is opened only during discharge. At least one of the first valve, the second valve, and the third valves may be a check valve and the rest may be an electromagnetic valve.

The scope of the present disclosure should include modifications that those skilled in the art can obtain by adding various design changes to the exemplary embodiments described above, as well as modifications implemented by freely combining components and functions described herein without deviating from the gist of the present disclosure.

The present disclosure is applicable to an oral cavity washing device that washes an oral cavity by discharging a liquid.

What is claimed is:

1. An oral cavity washing device comprising:
a nozzle;
a first flow passage and a second flow passage; and
a pump that supplies a liquid to the nozzle,
wherein the nozzle comprises:
    a nozzle flow passage; and
    a reduced part in a middle of the nozzle flow passage, the reduced part being smaller in cross-sectional area than a rest part of the nozzle flow passage,
only one pump is included in the oral cavity washing device,
only one cylinder is included in the only one pump,
the first flow passage has a first valve that causes the first flow passage to be opened only when the pump sucks the liquid,
the second flow passage has a second valve that causes the second flow passage to be opened only when the pump discharges the liquid,
the first flow passage and the second flow passage are in parallel to each other and disposed between the nozzle and the pump, such that the opening of the first flow passage allows the pump to suck the liquid from the nozzle,
the first flow passage and the second flow passage communicate to the only one cylinder, and
the opening of the second flow passage allows the pump to discharge the liquid from the nozzle.

2. The oral cavity washing device according to claim 1, wherein the first valve and the second valve are check valves that allow the liquid to flow in opposite directions.

3. The oral cavity washing device according to claim 2, wherein the first flow passage, the first valve, the second flow passage, and the second valve are combined into a module.

4. An oral cavity washing device comprising:
a nozzle; and
a pump that supplies a liquid to the nozzle, wherein:
the nozzle comprises:
    a nozzle flow passage; and
    a reduced part in a middle of the nozzle flow passage, the reduced part being smaller in cross-sectional area than a rest part of the nozzle flow passage,
a first flow passage is disposed between the nozzle and the pump and a second flow passage is disposed between the nozzle and the pump,
the first flow passage and the second flow passage are arranged in parallel to each other between the nozzle and the pump,
the first flow passage has a first valve that causes the first flow passage to be opened only when the pump sucks the liquid, the second flow passage has a second valve that causes the second flow passage to be opened only when the pump discharges the liquid, the oral cavity washing device further comprises:
   a third flow passage to guide the liquid to a cylinder of the pump; and
   a third valve disposed in the third flow passage to cause the third flow passage to be opened only when the pump sucks the liquid, and
a cross-sectional area of the first flow passage at a portion to which the first valve contacts is smaller than a cross-sectional area of the third flow passage at a portion to which the third valve contacts.

5. The oral cavity washing device according to claim 4, wherein the cross-sectional area of the first flow passage ranges from 2.25% to 49% inclusive of the cross-sectional area of the third flow passage.

6. The oral cavity washing device according to claim 4, wherein an elastic force of a first spring included in the first valve is greater than or equal to an elastic force of a third spring included in the third valve.

7. The oral cavity washing device according to claim 4, wherein:
   only one pump is included in the oral cavity washing device,
   only one cylinder is included in the only one pump, and
   the first flow passage and the second flow passage communicate to the only one cylinder.

8. An oral cavity washing device comprising:
a nozzle;
a first flow passage and a second flow passage; and
a pump that supplies a liquid to the nozzle, wherein:
the nozzle comprises:
   a nozzle flow passage; and
   a reduced part in a middle of the nozzle flow passage, the reduced part being smaller in cross-sectional area than a rest part of the nozzle flow passage, the first flow passage has a first valve that causes the first flow passage to be opened only when the pump sucks the liquid, the second flow passage has a second valve that causes the second flow passage to be opened only when the pump discharges the liquid, the first flow passage and the second flow passage are in parallel to each other and disposed between the nozzle and the pump, such that the opening of the first flow passage allows the pump to suck the liquid from the nozzle, and the opening of the second flow passage allows the pump to discharge the liquid from the nozzle, the oral cavity washing device further comprises:
   a third flow passage to guide the liquid to a cylinder of the pump; and
   a third valve disposed in the third flow passage to cause the third flow passage to be opened during suction performed by the pump,
a cross-sectional area of the first flow passage at a portion to which the first valve contacts is larger than or equal to a cross-sectional area of the third flow passage at a portion to which the third valve contacts, and
an elastic force of a first spring included in the first valve is greater than an elastic force of a third spring included in the third valve.

9. The oral cavity washing device according to claim 8, wherein:
   only one pump is included in the oral cavity washing device,
   only one cylinder is included in the only one pump, and
   the first flow passage and the second flow passage communicate to the only one cylinder.

\* \* \* \* \*